(12) United States Patent
Liu et al.

(10) Patent No.: US 11,354,097 B2
(45) Date of Patent: Jun. 7, 2022

(54) COMPRESSOR CIRCUIT, WALLACE TREE CIRCUIT, MULTIPLIER CIRCUIT, CHIP, AND DEVICE

(71) Applicant: Cambricon Technologies Corporation Limited, Beijing (CN)

(72) Inventors: Enhe Liu, Beijing (CN); Shaoli Liu, Beijing (CN); Zhen Li, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/623,385

(22) PCT Filed: Apr. 4, 2019

(86) PCT No.: PCT/CN2019/081407
§ 371 (c)(1),
(2) Date: Mar. 9, 2020

(87) PCT Pub. No.: WO2019/196727
PCT Pub. Date: Oct. 17, 2019

(65) Prior Publication Data
US 2021/0034330 A1  Feb. 4, 2021

(30) Foreign Application Priority Data

Apr. 10, 2018 (CN) .......................... 201810316616.8

(51) Int. Cl.
*G06F 7/501* (2006.01)
*G06F 7/523* (2006.01)

(52) U.S. Cl.
CPC .............. *G06F 7/501* (2013.01); *G06F 7/523* (2013.01)

(58) Field of Classification Search
CPC .... G06F 7/50–501; G06F 7/505; G06F 7/509; G06F 2207/3868; G06F 2207/3852; G06F 2207/4812; G06F 2207/4922
See application file for complete search history.

(56) References Cited

U.S. PATENT DOCUMENTS

| 5,081,607 | A | * | 1/1992 | Bates | G06F 7/505 708/518 |
| 5,687,107 | A | * | 11/1997 | Igura | G06F 7/501 326/52 |
| 2005/0071416 | A1 | * | 3/2005 | Gonzalez | G06F 7/607 708/700 |

* cited by examiner

*Primary Examiner* — Matthew D Sandifer
(74) *Attorney, Agent, or Firm* — Getech Law LLC; Jun Ye

(57) ABSTRACT

The present disclosure provides a compressor circuit, a Wallace tree circuit, a multiplier circuit, a chip and an apparatus. The compressor circuit includes a first full adder, a second full adder, and a first selection circuit. An output end of the first full adder is connected to an input end of the first selection circuit, and an output end of the first selection circuit is connected to an input end of the second full adder. The first selection circuit is configured to determine an input signal output by the first selection circuit to the second full adder according to a first selection signal; and the input signal output by the first selection circuit to the second full adder and a most significant bit signal of a plurality of input signals of the compressor circuit are used to control turning on and turning off of the second full adder, which can reduce circuit power consumption and delay.

6 Claims, 8 Drawing Sheets

COMPRESSOR CIRCUIT, WALLACE TREE CIRCUIT, MULTIPLIER CIRCUIT, CHIP, AND DEVICE

CROSS REFERENCES OF RELATED APPLICATIONS

The present application claims priority to: Chinese Patent Application No. 201810316616.8 with the title of "Compressor Circuit, Wallace Tree Circuit, Multiplier Circuit, Chip and Apparatus" and filed on Apr. 10, 2018. The entire contents of the present application are incorporated herein by reference.

TECHNICAL FIELD

The disclosure relates generally to the field of circuit, and more specifically to a compressor circuit, a Wallace tree circuit, a multiplier circuit, a chip and an apparatus.

BACKTROUND

With the development of AI (Artificial Intelligence) technology, the AI chip has become a focus in the current technology industry and society. The multiplier circuit is one of the main circuits of the AI chip, and the performance of the multiplier circuit is particularly important.

In general, the compressor is a very important unit in the multiplier. The performance and power consumption of the compressor directly affect the performance and power consumption of the multiplier. FIG. 1 is a structure diagram of a circuit of a 4-2 compressor in the prior art. As shown in FIG. 1, the 4-2 compressor includes a first full adder and a second full adder. By performing operations on the first full adder and the second full adder, the 4-2 compressor transforms four input signals I1, I2, I3, and I4 into two output signals, carry and sum.

However, in some small numerical operations, the existing compressors have the problem of high power consumption and delay.

SUMMARY

In order to solve the above technical problem of high power consumption and delay, the present disclosure provides a compressor circuit, a Wallace tree circuit, a multiplier circuit, a chip and an apparatus.

An embodiment of the present disclosure provides a compressor circuit, which includes a first full adder, a second full adder, and a first selection circuit. An output end of the first full adder is connected to an input end of the first selection circuit, and an output end of the first selection circuit is connected to an input end of the second full adder. The first selection circuit is configured to determine an input signal output by the first selection circuit to the second full adder according to a first selection signal; and the input signal output by the first selection circuit to the second full adder and a most significant bit signal of a plurality of input signals of the compressor circuit are used to control turning on and turning off of the second full adder.

In the embodiment of the present disclosure, the compressor circuit includes the first full adder, the second full adder, and the first selection circuit, where the output end of the first full adder is connected to the input end of the first selection circuit, and the output end of the first selection circuit is connected to the input end of the second full adder. The compressor circuit controls the output signal of the first selection circuit by configuring the first selection signal, so that the output signal of the first selection circuit is a low level signal in some scenarios. When the output signal of the first multiplexer and the most significant bit signal of a plurality of input signals of the compressor circuit are both low level signals, the second full adder will not invert logic level signal, that is, the second full adder is turned off and does not generate any energy consumption and delay, which may effectively reduce the energy consumption and delay of the compressor circuit.

In an embodiment, the compressor circuit further includes a second selection circuit.

A first input end of the second selection circuit is connected to an output end of the first full adder, and a second input end of the second selection circuit is connected to an output end of the second full adder; where the second selection circuit determines that the output of the second selection circuit is the output signal of the first full adder or the output signal of the second full adder according to the high and low levels of the second selection signal.

In the embodiment of the present disclosure, the compressor circuit further includes the second selection circuit, where the first input end of the second selection circuit is connected to the output end of the first full adder, and the second input end of the second selection circuit is connected to the output end of the second full adder. The compressor circuit controls whether the output of the second selection circuit is the output signal of the first full adder or the output signals of the second full adder by configuring the second selection signal. When the most significant bit signal of the plurality of input signals of the compressor circuit is a low level signal, the compressor circuit uses the second selection signal to control that the output of the second selection circuit is the output signal of the second full adder. Particularly, when the most significant bit signal of the plurality of input signals of the compressor circuit is a low level signal, the compressor circuit uses the second selection signal to control that the output of the second selection circuit is the output signal of the first full adder. In this way, the situation that the output signal of the second full adder is the output signal of the second full adder may be avoided when the output signal of the second full adder is the low level signal, and the accuracy of the output signal may be guaranteed.

In an embodiment, the first selection circuit includes a first multiplexer and a second multiplexer, where an output end of the first multiplexer is connected to a third input end of the second full adder, and a first input end of the second full adder is connected to an output end of the second multiplexer. A second input end of the second full adder is configured to receive the most significant bit signal, and an output end of the second full adder is connected to the second input end of the second selection circuit. The output end of the first full adder is respectively connected to the first input end of the second multiplexer and the first input end of the second selection circuit.

In the embodiment of the present disclosure, the first selection circuit includes the first multiplexer and the second multiplexer, the first selection circuit controls output signals of the first multiplexer and the second multiplexer by configuring a selection signal of the first multiplexer and the second multiplexer, thereby controlling the turning on or turning off of the second full adder. Particularly, when the most significant bit signal of the input signals of the compressor circuit is 0, turning off the second full adder may reduce power consumption and delay of the compressor circuit. In addition, the first multiplexer and the second multiplexer are used to constitute the first selection circuit, which is simple in structure, easy to implement and low in cost.

In an embodiment, the first selection circuit includes a first AND gate circuit and a second AND gate circuit, where an output end of the first AND gate circuit is connected to a third input end of the second full adder, and a first input end of the second full adder is connected to an output end of the second AND gate. The second input end of the second full adder is configured to receive the most significant bit signal, the output end of the second full adder is connected to the second input end of the second selection circuit, and the output end of the first full adder is respectively connected to the first input end of the second AND circuit and the first input end of the second selection circuit.

In the embodiment of the present disclosure, the first selection circuit includes the first AND gate circuit and the second AND gate circuit. The first selection circuit controls output signals of the first AND gate circuit and the second AND gate circuit by configuring the selection signal, thereby controlling the turning on or turning off of the second full adder. Particularly, when the most significant bit signal of the input signals of the compressor circuit is 0, turning off the second full adder may reduce power consumption and delay of the compressor circuit. In addition, the first AND gate circuit and the second AND gate circuit are used to constitute the first selection circuit, which is simple in structure, easy to implement and low in cost.

In an embodiment, the second selection circuit includes a third multiplexer and a fourth multiplexer. A first input end of the third multiplexer is connected to the first output end of the first full adder, and a second input of the third multiplexer is connected to the first output end of the second full adder; a first input end of the fourth multiplexer is connected to the second output end of the first full adder, and a second input end of the fourth multiplexer is connected to the second output end of the second full adder.

In the embodiment of the present disclosure, the second selection circuit includes the third multiplexer and the fourth multiplexer. The second selection circuit controls the third multiplexer and the fourth multiplexer by configuring the selection signal of the third multiplexer and the fourth multiplexer, thereby controlling the output signal of the compressor circuit. When the output signal of the second full adder is 0, the final output of the compressor circuit is the output signal of the first full adder; when the output signal of the second full adder is not 0, the final output of the compressor circuit is the output signal of the second full adder, so that the accuracy of the output signal may be guaranteed. In addition, the first multiplexer and the second multiplexer are used to constitute the first selection circuit, which is simple in structure, easy to implement and low in cost.

In an embodiment, the first selection signal and the second selection signal are any one of the following signals: a signal determined according to the most significant bit signal of a plurality of input signals, a preset invertible logic level signal, a signal obtained by prediction based on a historical selection signal, and a signal determined by an encoder in a multiplier circuit where the compressor circuit is located.

In the embodiment of the present disclosure, multiple methods can be used to flexibly determine the first selection signal and the second selection signal, and the multiple methods can be applied to multiple scenarios. Particularly, in a scene where the input signal is a small value, when the input most significant bit signal is 0, both the input signal and output signal of the second full adder are 0 under the control of the first selection signal, that is, the second full adder is turned off, which may effectively reduce energy consumption and delay.

An embodiment of the present disclosure provides a Wallace tree circuit, which includes one or more of the above-mentioned compressor circuits.

In the embodiment of the present disclosure, the Wallace tree circuit may include one compressor circuit or a combination of a plurality compressor circuits. The Wallace tree circuit is configured to accumulate a column of each partial product to obtain two channels of output signals. For a Wallace tree circuit composed of a compressor circuit, a full adder may be turned off in the compressor circuit of the first level (or the first pipeline stage), thereby reducing the energy consumption.

An embodiment of the present disclosure provides a compression tree circuit, which includes one or more of the above-mentioned Wallace tree circuits.

An embodiment of the present disclosure provides a multiplier circuit, which includes a partial product circuit and the above-mentioned compression tree circuit. An output end of the partial product circuit is connected to an input end of the compression tree circuit.

In the embodiment of the present disclosure, the multiplier circuit includes the partial product circuit and compression tree circuit, where an output end of the partial product circuit is connected to the input end of the compression tree circuit. The compression tree circuit includes one or more of the above-mentioned Wallace tree circuits, and the Wallace tree circuit includes the compression tree circuit according to any one of the above embodiments. The Wallace tree circuit controls the output signal of the first selection circuit of the compressor circuit by configuring the first selection signal, so that the output signal of the first selection circuit is a low level signal in some scenarios. When the output signal of the first multiplexer and the most significant bit signal of the plurality of input signals of the compressor circuit are both low level signals, the second full adder will not invert the logic level signal, that is, the second full adder is turned off and does not generate any energy consumption and delay, which may effectively reduce the energy consumption and delay of the compressor circuit, in this way, the energy consumption and delay of the multiplier circuit may be also reduced.

In an embodiment, the multiplier circuit further includes an encoding circuit, where an output end of the encoding circuit is connected to an input end of the partial product circuit.

In the embodiment of the present disclosure, the encoding circuit is configured to encode a first input signal of the multiplier circuit, which can reduce the number of partial products, thereby reducing the power consumption of subsequent compression tree circuits. In this way, the efficiency of the compression tree circuit can be improved and the delay can be reduced.

In an embodiment, the multiplier circuit further includes an addition circuit, where an output end of the compression tree circuit is connected to an input end of the addition circuit. The addition circuit includes one or more adders.

An embodiment of the present disclosure provides a chip, which includes one or more of the above-mentioned multiplier circuits.

An embodiment of the present disclosure provides an electronic apparatus, which includes the above-mentioned chip.

BRIEF DESCRIPTION OF THE DRAWINGS

In order to more clearly describe and illustrate embodiments and/or examples of the present disclosure, reference may be made to the following drawings. The additional details or examples used to describe the drawings should not be considered as limiting the scope of any of the disclosed inventions, the currently described embodiments and/or examples, and the best mode of these inventions as currently understood.

DESCRIPTION OF THE MARKS OF THE DRAWINGS

DETAILED DESCRIPTION OF THE EMBODIMENTS

In order to more clearly illustrate the purpose, technical solutions, and advantages of the present disclosure, further details of the present disclosure are given below with reference to the accompanied drawings and embodiments. It should be understood that the specific embodiments described herein are only used to explain the present disclosure, and are not intended to limit the disclosure.

The compressor circuit and the multiplier circuit provided in this present disclosure can be applied to an AI (artificial intelligence) chip, an FPGA (Field-Programmable Gate Array) chip, or other hardware circuit apparatuses for operation and processing.

Figure 2:
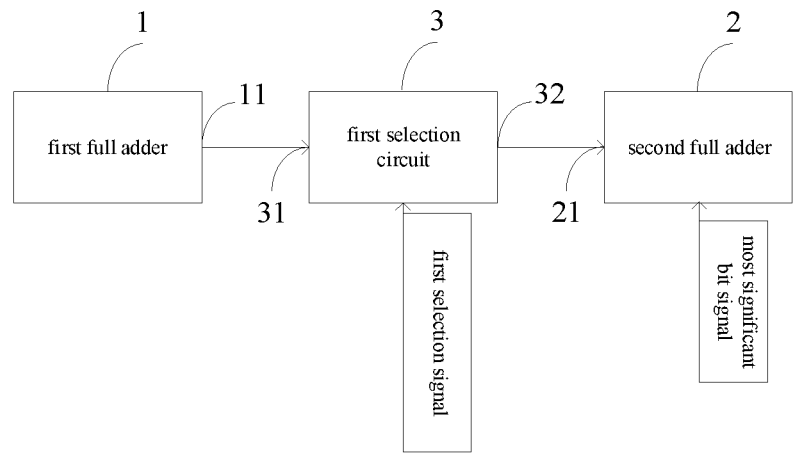
FIG. 2 is a structural diagram of a compressor circuit provided by an embodiment of the present disclosure.

FIG. 2 is a structural diagram of a compressor circuit provided by an embodiment of the present disclosure. As shown in FIG. 2, the compressor circuit includes a first full adder 1, a second full adder 2, and a first selection circuit 3, where an output end 11 of the first full adder is connected to an input end 31 of the first selection circuit, and an output end 32 of the first selection circuit is connected to an input end 21 of the second full adder. The first selection circuit 3 is configured to determine an input signal output by the first selection circuit 3 to the second full adder 2 according to a first selection signal; and the input signal output by the first selection circuit 3 to the second full adder 2 and a most significant bit signal of a plurality of input signals of the compressor circuit are used to control turning on and turning off of the second full adder 2.

In the embodiment of the present disclosure, the first full adder 1 and the second full adder 2 are a combination circuit that uses a gate circuit to add binary numbers and get the sum. The first full adder 1 and the second full adder 2 can process the plurality of input signals of the compressor circuit to convert the plurality of input signals into two output signals. The structures of the first full adder 1 and the second full adder 2 may be the same or different, which can be selected according to actual needs.

| | | | |
|---|---|---|---|
| 1: | first full adder | 2: | second full adder |
| 3: | first selection circuit | 4: | second selection circuit |
| 5: | first multiplexer | 6: | second multiplexer |
| 7: | third multiplexer | 8: | fourth multiplexer |
| 11: | output end of the first full adder | 12: | first output end of the first full adder |
| 13: | second output end of the first full adder | 21: | input end of the second full adder |
| 22: | output end of the second full adder | 23: | first input end of the second full adder |
| 24: | second input end of the second full adder | 25: | third input end of the second full adder |
| 26: | first output end of the second full adder | 27: | second output end of the second full adder |
| 31: | input end of the first selection circuit | 32: | output end of the first selection circuit |
| 41: | first input end of the second selection circuit | 42: | second input end of the second selection circuit |
| 51: | output end of the first multiplexer | 52: | second input end of the first multiplexer |
| 53: | first input end of the first multiplexer | 61: | first input end of the second multiplexer |
| 62: | second input end of the second multiplexer | 63: | output end of the second multiplexer |
| 71: | first input end of the third multiplexer | 72: | second input end of the third multiplexer |
| 81: | first input end of the fourth multiplexer | 82: | second input end of the fourth multiplexer |
| 101: | partial product circuit | 102: | compression tree circuit |
| 103: | compressor circuit | 104: | encoding circuit |
| 105: | addition circuit | 106: | Wallace tree circuit |
| 220: | first AND gate circuit | 210: | second AND gate circuit |
| 54: | first input end of the first AND gate circuit | 64: | first input end of the second AND gate circuit |
| 55: | second input end of the first AND gate circuit | 65: | second input end of the second AND gate circuit |
| 56: | output end of the first AND gate circuit | 66: | output end of the second AND gate circuit |
| 1011: | output end of the partial product circuit | 1021: | input end of the compression tree circuit |
| 1022: | output end of the compression tree circuit | 1041: | output end of the encoding circuit |
| 1051: | input end of the addition circuit | | |

$I1, I2, I3, I4, I6, I7, \ldots, I15$: input signals; Carry, Sum: output signals;
$Cin, Ci0, Ci1, Ci2, Ci3, Ci4, Ci5, \ldots, Ci13$: carry input;
$Cout, Co0, Co1, Co2, Co3, Co4, Co5, \ldots, Co13$: carry output.

The first selection circuit 3 may be a circuit composed of MUXs (multiplexers). The first selection circuit 3 may control an output signal of the first selection circuit 3 by configuring a first selection signal (sel signal). For example, a two-channel multiplexer has a first input signal and a second input signal. When a selection signal of the two-channel multiplexer is 0, the first input signal is selected as the output signal; when a selection signal of the two-channel multiplexer is 1, the second input signal is selected as an output signal, that is, the output result of the two-channel multiplexer is selected among the two input signals through the selection signal. In addition, the logic of the multiplexer can be flexibly set. In the above-mentioned example, when a selection signal is 0, the first input signal is selected as the output signal of the two-channel multiplexer; when a selection signal is 1, the second input signal is selected as the output of the two-channel multiplexer. In other embodiments, when the selection signal is 1, the first input signal may be selected as the output signal of the two-channel multiplexer; when the selection signal is 0, the second input signal is selected as the output of the two-channel multiplexer.

For example, the first selection circuit may be composed of a plurality of two-channel multiplexers, and the first selection circuit is configured in advance. When the first selection signal is a low level signal, the first selection circuit selects to output the low level signal, that is, if the first selection signal is 0, the output signal of the first selection circuit is also 0; or when the first selection signal is a high-level signal, the first selection circuit selects to output the output signal of the first full adder, that is, if the first selection signal is 1, the output signal of the first selection circuit is the output signal of the first full adder. Alternatively, when the first selection signal is a low level signal, the first selection circuit selects to output the output signal of the first full adder; when the first selection signal is a high-level signal, the first selection circuit selects to output the low level signal. The configuration of the first selection signal can ensure that when the most significant bit signal of the plurality of input signals of the compression circuit is 0, the first selection circuit may select to output a signal 0.

Alternatively, the input signal of the first selection circuit does not depend on external signals, but is integrated in the first selection circuit, and a mapping relationship between the input signal and the first selection signal is configured in advance. For example, a low level signal 0 and a high-level signal 1 are integrated in the first selection circuit, where when the first selection signal is 0, the first selection circuit outputs the low level signal 0; and when the first selection signal is 1, the first selection circuit outputs the high-level signal 1. Alternatively, when the first selection signal is 1, the first selection circuit outputs the low level signal 0; when the first selection signal is 0, the first selection circuit outputs the high-level signal 1. Alternatively, as long as mapping relationship between other types of signal and the first selection signal can be established, the other types of signals may also be integrated inside the first selection circuit.

The first selection signal can be obtained in various ways. For example, a default signal may be preset as the first selection signal; or the first selection signal may be obtained by prediction based on a certain number of previous input selection signals; or the most significant bit signal of the input signals of the compressor circuit may be taken as the first selection signal. Those skilled in the art can obtain the selection signal according to the actual application scenario and requirements.

The main principle of the compressor circuit is to control the output signal of the first selection circuit 3 by configuring the first selection signal, and use the output signal of the first selection circuit 3 and the most significant bit signal of the plurality of input signals of the compressor circuit as an input signal of the second full adder 2, in order to control the turning on or turning off of the second full adder 2.

For example, in neural network operations, a large amount of neural network operation data is zero or close to zero, and more data will be zero or close to zero after sparse processing and/or compressing processing. After a large amount of neural network operation data is converted into binary data, the corresponding most significant bit signal of the plurality of output signals is a low level signal, and the first selection signal may also be set to a low level signal. In other words, the most significant bit signal of the plurality of input signals of the compressor circuit is 0; and the first selection signal may also be set to 0, so that the input signals of the second full adder are all 0, and the output signals of the second full adder are also 0, in this way, when the second full adder processes the input signals, the logic level signal inversion does not occur, that is, the second full adder is turned off. In the embodiment of the present disclosure, when the most significant bit signal is 0, the first selection signal may also be set to 1; the first selection circuit is configured to ensure that when the first selection signal is 1, the output signal of the first selection circuit is 0. That is, the configuration of the first selection signal is not limited to this embodiment, as long as the first selection circuit logically selects the signal corresponding to the actual demand.

If the most significant bit signal of the plurality of input signals of the compressor circuit is a high-level signal, the first selection signal may also be set to a high-level signal, that is, the most significant bit signal of the plurality of input signals of the compressor circuit is 1, the first selection signal is 1, so that the input signal and the output signal of the second full adder are not 0, in this way, the second full adder needs to invert the logic level signal when processing the input signals, that is, the second full adder is turned on. That the input signals of the second full adder are not 0 means that at least one channel of input signals of the second full adder are not 0; that the output signals of the second full adder are not 0 means that at least one output signal of the second full adder are not 0. For example, the most significant bit signal of the plurality of input signals is one input signal of the second full adder, when the most significant bit signal is 1, the input signals of the second full adder are not 0 regardless of whether other input signals are 0 or not.

It should be noted that the turning on and turning off of the second full adder described in the embodiment of the present disclosure is not a state transition like power-on or power-off, but the turning on of the second full adder means that the second full adder needs to invert the logic level signal when processing the input signals. For example, the second full adder inverts a logic level signal 0 to a logic level signal 1 or inverts a logic level signal 1 to a logic level signal 0. The turning off of the second full adder means that the second full adder does not invert the logic level signal when processing the input signals, for example, when all input logic level signals are 0, the second full adder does not invert the logic level signals, and the output logic level signals are also 0. In the embodiment of the present disclosure, 0 represents a low level signal, and 1 represents a high-level signal.

The compressor circuit provided by the embodiment of the present disclosure includes the first full adder, the second full adder, and the first selection circuit, where the output end of the first full adder is connected to the input end of the first selection circuit, and the output end of the first selection circuit is connected to the input end of the second full adder. The compressor circuit controls the output signal of the first selection circuit by configuring the first selection signal, so that the output signal of the first selection circuit is a low level signal in some scenarios. When the output signal of the first multiplexer and the most significant bit signal of a plurality of input signals of the compressor circuit are both low level signals, the second full adder will not invert of logic level signal, that is, the second full adder is turned off and does not generate any energy consumption and delay, which may effectively reduce the energy consumption and delay of the compressor circuit.

In an embodiment, the first selection signal may be any one of the following signals: a signal determined according to the most significant bit signal of a plurality of input signals, a preset invertible logic level signal, a signal obtained by prediction based on a historical selection signal, and a signal determined by an encoder in a multiplier circuit where the compressor circuit is located.

If the first selection signal is determined according to the most significant bit signal of the plurality of input signals, the determination rule is: if the most significant bit signal is a high-level signal, then the first selection signal is a high-level signal; and if the most significant bit signal is a low level signal, then the first selection signal is a low level signal. The determination rule is particularly suitable for the scenario where the input signal of the compressor circuit is a small value. When the input most significant bit signal is 0 and the first selection signal is also 0, the input signal and output signal of the second full adder 2 are both 0, that is, the second full adder is turned off, which may effectively reduce the energy consumption and delay.

If the first selection signal is a preset invertible logic level signal, a default signal may be preset as the first selection signal. During the operation of the circuit, if it is detected that the output signal has multiple errors in succession, the first selection circuit can invert the first selection signal. For example, if the preset first selection signal is 0, when it is detected that the output signal of the compressor circuit has multiple errors in succession, the first selection signal will be inverted to 1. The methods for detecting whether the output signal has errors include: detecting by a tester with a certain testing tool, or automatically detecting by setting a feedback circuit or a controller in the compressor circuit. After the number of errors in succession of the output signal exceeds a preset threshold, the first selection signal is automatically inverted.

If the first selection signal is a signal obtained by prediction based on a historical selection signal, all or part of the historical selection signals within a preset historical time period may be obtained to predict the first selection signal. Prediction rules may be determined according to actual conditions and needs. For example, a 4-states state machine is set in the compressor circuit to predict the first selection signal.

If the first selection signal is a signal determined by an encoder in a multiplier circuit where the compressor circuit is located, in general, the multiplier circuit may include an encoder and a compressor circuit, where the encoder is configured to encode the input signals of the compressor circuit, determine the first selection signal according to an encoding result, and add an additional output signal as the first selection signal based on the original output signals. For example, if the most significant bit signal of the output signals of the encoder is 0, the encoder sets the first selection signal to 0; if the most significant bit signal of the output signals of the encoder is 1, the encoder sets the first selection signal to 1, but it is not limited to the two situations.

Figure 3:
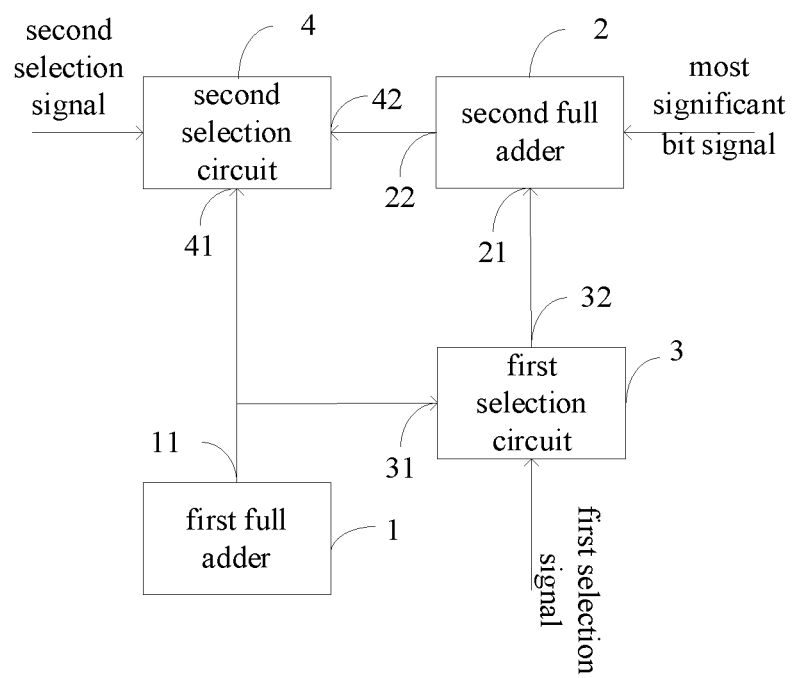
FIG. 3 is a structural diagram of a compressor circuit provided by a second embodiment of the present disclosure.

FIG. 3 is a structural diagram of a compressor circuit provided by a second embodiment of the present disclosure. This embodiment provides a specific implementation manner that the second selection circuit determines, according to the selection signal, that the compressor circuit finally outputs the output signals of the first full adder or the output signals of the second full adder.

Based on the embodiment shown in FIG. 2, as shown in FIG. 3, the compressor circuit further includes a second selection circuit 4, where the first input end 41 of the second selection circuit is connected to the output end 11 of the first full adder, and the second input end 42 of the second selection circuit is connected to the output end 22 of the second full adder. The second selection circuit determines whether the output of the second selection circuit is the output signals of the first full adder or the output signals of the second full adder according to whether the level of the second selection signal is high or low.

In the embodiment of the present disclosure, the second selection circuit 4 outputs the output signals of the first full adder 1 when the second selection signal is a low level signal, and the second selection circuit 4 outputs the output signals of the second full adder 2 when the second selection signal is a high level signal. Alternatively, the second selection circuit 4 outputs the output signals of the first full adder 1 when the second selection signal is a high level signal, and the second selection circuit 4 outputs the output signals of the second full adder 2 when the second selection signal is a low level signal. The configuration of the second selection signal only needs to satisfy that the compressor circuit can finally output a correct result based on actual requirements.

In the embodiment of the present disclosure, the second selection circuit 4 may be a circuit composed of a plurality of data multiplexers. For example, the second selection circuits may be composed of two two-channel multiplexers. The second selection circuit 4 and the first selection circuit 3 may be circuits having the same function and structure, or two circuits having different functions or structures; or the second selection circuit 4 and the first selection circuit 3 may be two circuits having the same functions but different logic structures. For example, the output signals of the second selection circuit 4 are 0 when the second selection signal is 1, the output signals of the first selection circuit 3 are non-zero when the second selection signal is 1, and other situations may also happen, which are not limited in this embodiment.

The compressor circuit controls whether the output of the second selection circuit 4 is the output signals of the first full adder or the output signals of the second full adder by configuring the second selection signal. For example, if the second selection signal is a high level signal, the output of the second selection circuit 4 is the output signals of the second full adder 2; if the second selection signal is a low level signal, the output of the second selection circuit 4 is the output signals of the first full adder 1. Alternatively, if the second selection signal is a low level signal, the output of the second selection circuit 4 is the output signals of the second full adder 2; if the second selection signal is a high level signal, the output of the second selection circuit 4 is the output signals of the first full adder 1.

The logic levels of the selection signal of the first selection circuit 3 and the selection signal of the second selection circuit 4 are the same. For example, the first selection signal and the second selection signal are both high level; or the first selection signal and the second selection signal are both low level. Taking the FIG. 3 as an example, when the most significant bit signal of the plurality of input signals of the compressor circuit is 0, the first selection signal is also 0, so that the output signals of the first selection circuit 3 are 0; when the output signals of the first selection circuit 3 are 0, the input signals of the second full adder 2 are all 0; and when the input signals of the second full adder 2 are all 0, the output signals of the second full adder 2 are 0. When the second selection signal is 0, the output of the second selection circuit 4 is the output signals of the first full adder 1, and the output signals of the first selection circuit are the output of the first full adder, where the output signals of the first selection circuits are 0 or 1 or other signals. When the most significant bit signal of the plurality of input signals of the compressor circuit is 1, the first selection signal is also 1, so that the output of the first selection circuit 3 is the output signals of the first full adder, that is, the input signals of the second full adder 2 are also the output signals of the first full adder 1; when the second selection signal is 1, the output of the second selection circuit 4 is the output signals of the second full adder 2, which can guarantee the accuracy of the output signals of the compressor circuit.

Optionally, the logic levels of the first selection signal and the second selection signal may also be different. For example, when the most significant bit signal is 1, the second selection signal is 1, and the first selection signal is 0, however, the logic levels of the first selection signal and the second selection signal may also be different. The configuration of the second selection signal and the first selection signal only needs to ensure that when the most significant bit signal is 1, the second selection circuit selects out the output result of the second full adder. The above-mentioned embodiment is merely an exemplary description, which is not a limitation on the embodiment of the present disclosure.

Optionally, in the embodiment of the present disclosure, the second selection signal may be any one of the following signals: a signal determined according to the most significant bit signal of a plurality of input signals, a preset invertible logic level signal, a signal obtained by prediction based on a historical selection signal, and a signal determined by an encoder in a multiplier circuit where the compressor circuit is located. For a specific implementation manner, please refer to the method for obtaining a first selection signal in the embodiment shown in FIG. 2, the details are not repeated in detail here.

In the embodiment of the present disclosure, the compressor circuit further includes the second selection circuit, where the first input end of the second selection circuit is connected to the output end of the first full adder, and the second input end of the second selection circuit is connected to the output end of the second full adder. The compressor circuit controls whether the output of the second selection circuit is the output signals of the first full adder or the output signals of the second full adder by configuring the second selection signal. When the most significant bit signal of the plurality of input signals of the compressor circuit is a low level signal, the compressor circuit controls that the output of the second selection circuit is the output signals of the second full adder by the second selection signal. Particularly, when the most significant bit signal of the plurality of input signals of the compressor circuit is a low level signal, the compressor circuit controls that the output of the second selection circuit is the output signals of the first full adder by the second selection signal. In this way, the situation that the output signals of the second full adder are the output signals of the second full adder may be avoided when the output signals of the second full adder are low level signals, and the accuracy of the output signals may be guaranteed.

Figure 4:
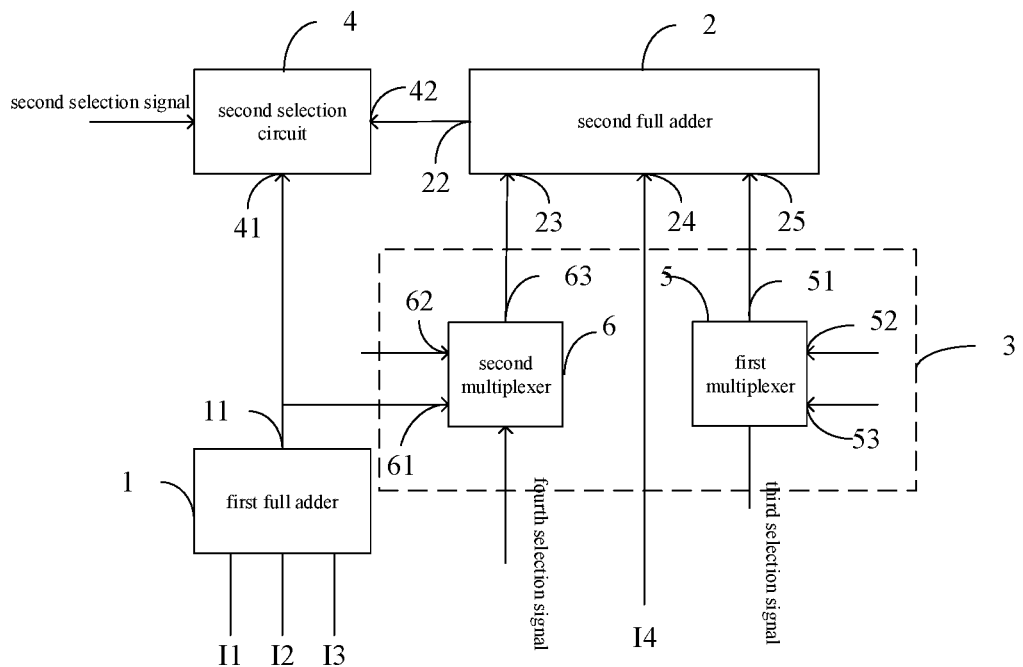
FIG. 4 is a structural diagram of a compressor circuit provided by a third embodiment of the present disclosure.

FIG. 4 is a structural diagram of a compressor circuit provided by a third embodiment of the present disclosure. The embodiment provides a specific implementation manner of the first selection circuit which is composed of two multiplexers. As shown in FIG. 4, the first selection circuit 3 includes a first multiplexer 5 and a second multiplexer 6, where an output end 51 of the first multiplexer is connected to a third input end 25 of the second full adder, and a first input end 23 of the second full adder is connected to an output end 63 of the second multiplexer. A second input end 24 of the second full adder is configured to receive a most significant bit signal (I4), an output end 22 of the second full adder is connected to a second input end 42 of the second selection circuit, and an output end 11 of the first full adder is connected to a first input end 61 of the second multiplexer and a first input end 41 of the second selection circuit, respectively.

In the embodiment shown in FIG. 4, I1, I2, I3, and I4 are 4 input signals of the compressor circuit, where I4 is the most significant bit signal. A first input end 53 of the first multiplexer receives a low level signal 0, and a second input end 52 of the first multiplexer receives signals output by other circuits or apparatus. When the third selection signal is a low level signal 0, a first multiplexer 5 outputs the signal 0 of the first input end 53 of the first multiplexer; when the third selection signal is a high level signal 1, the first multiplexer 5 outputs the signal of the second input end 52 of the first multiplexer. A second input end 62 of the second multiplexer receives the low level signal 0, and a first input end 61 of the second multiplexer receives the output signals of the first full adder 1. When the fourth selection signal is a low level signal 0, a second multiplexer 6 outputs the signal 0 of the second input end 62 of the second multiplexer; when the fourth selection signal is a high level signal 1, the second multiplexer 6 outputs the signal of the first input end 61 of the second multiplexer.

It should be noted that, in the above-mentioned embodiment, the third selection signal and the fourth selection signal may also be configured in other methods. For example, when the third selection signal is the high level signal 1, the first multiplexer 5 outputs the signal 0 of the first input end 53 of the first multiplexer; when the third selection signal is the low level signal 0, the first multiplexer 5 outputs the signal of the second input end 52 of the first multiplexer. When the fourth selection signal is the high level signal 1, the second multiplexer 6 outputs the signal 0 of the second input end 62 of the second multiplexer; when the fourth selection signal is the low level signal 0, the second multiplexer 6 outputs the signal of the first input end 61 of the second multiplexer, which is not limited in this embodiment.

Figure 5:
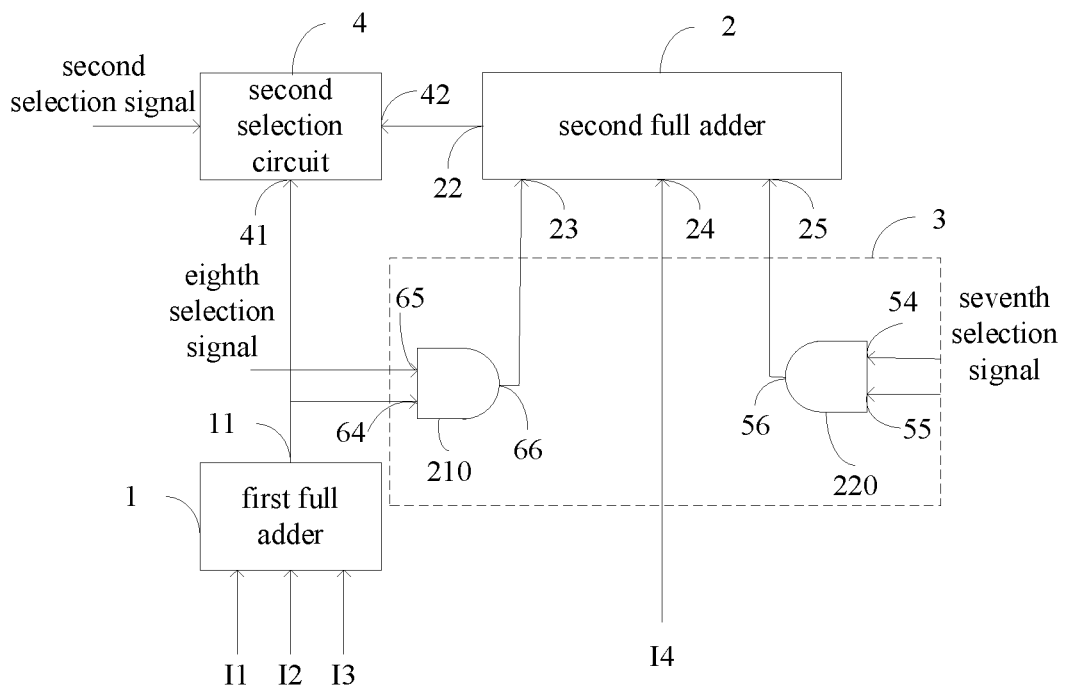
FIG. 5 is a structural diagram of a compressor circuit provided by a fourth embodiment of the present disclosure.

FIG. 5 is a structural diagram of a compressor circuit provided by a fourth embodiment of the present disclosure. The embodiment provides a specific implementation manner of the first selection circuit which is composed of two AND gate circuits. As shown in FIG. 5, the first selection circuit 3 includes a first AND gate circuit 220 and a second AND gate circuit 210, where an output end 56 of the first AND gate circuit is connected to a third input end 25 of the second full adder, and a first input end 23 of the second full adder is connected to an output end 66 of the second AND gate circuit. A second input end 24 of the second full adder is configured to receive the most significant bit signal (I4), an output end 22 of the second full adder is connected to a second input end 42 of the second selection circuit, and an output end 11 of the first full adder is connected to a first input end 64 of the second AND gate circuit and a first input end 41 of the second selection circuit, respectively.

In the embodiment shown in FIG. 5, I1, I2, I3, and I4 are 4 input signals of the compressor circuit, where I4 is the most significant bit signal. A first input end 54 of the first AND gate circuit receives a seventh selection signal, and a second input end 55 of the first AND gate circuit receives signals output by other circuits or apparatus. When the seventh selection signal is 0, the output signal of an output end 56 of the first AND gate circuit is 0. The input signal of a first input end 64 of the second AND gate circuit is the output signals of the first full adder 1, and the input signal of a second input end 65 of the second AND gate circuit is an eighth selection signal. When the eighth selection signal is 0, the output signal of the output end 66 of the second AND gate circuit is 0. When the most significant bit signal I4 is 0, both the seventh selection signal and the eighth selection signal are set to 0, then the output signal of the first AND gate circuit 220 and the output signal of the second AND gate circuit 210 are both 0, so that the input signals of the second full adder 2 are all 0, that is, the second full adder is turned off. When the most significant bit signal is 1, both the seventh selection signal and the eighth selection signal are set to 1, then the first AND gate circuit 220 outputs the input signal of the second input end 55 of the first AND gate circuit, and the second AND gate circuit 210 outputs the input signal of the first input end 64 of the second AND gate circuit.

Figure 6:
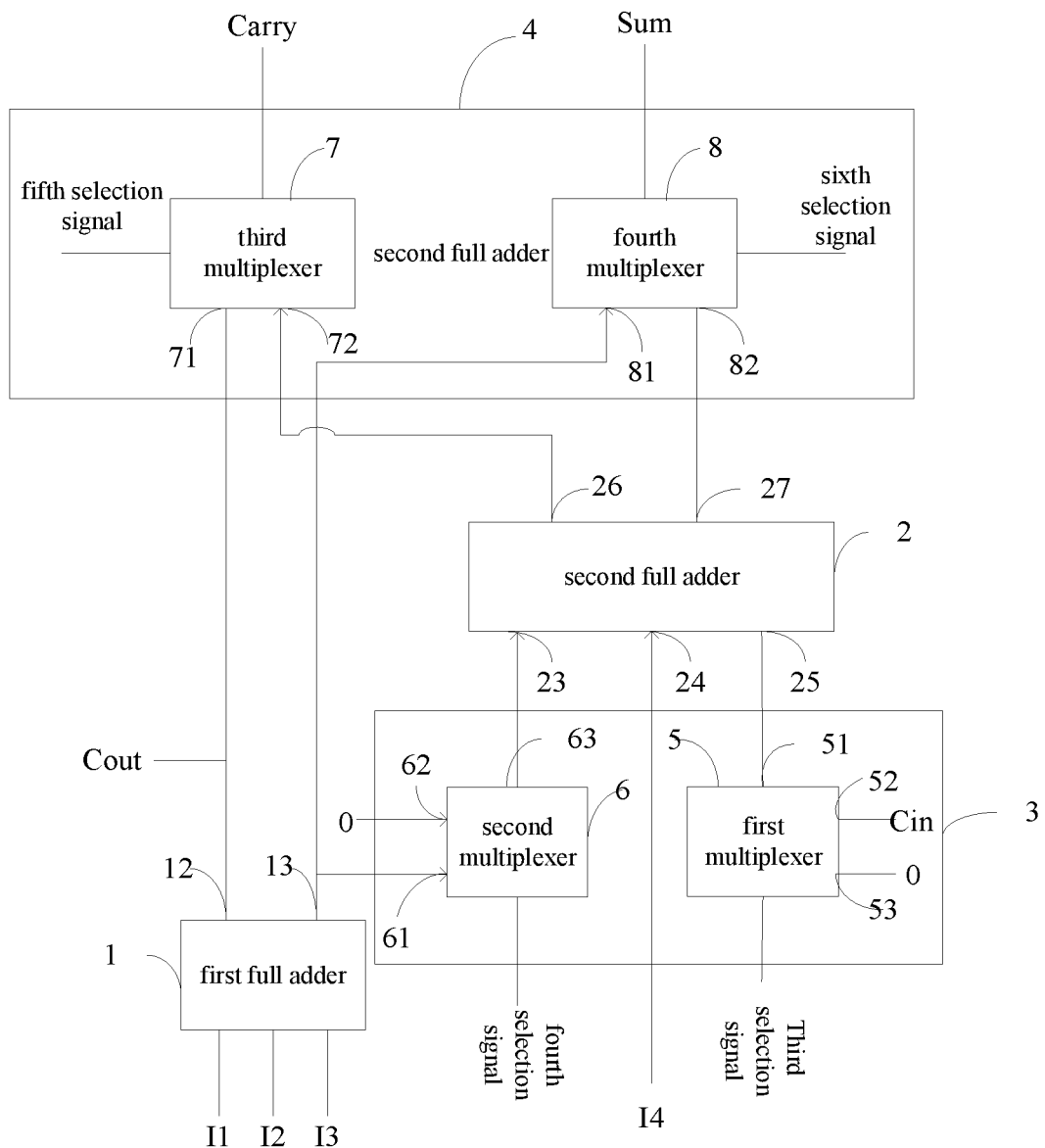
FIG. 6 is a structural diagram of a compressor circuit provided by a sixth embodiment of the present disclosure.

FIG. 6 is a structural diagram of a compressor circuit provided by a sixth embodiment of the present disclosure. The embodiment provides a specific implementation manner of the second selection circuit which is composed of two multiplexers. As shown in FIG. 6, the second selection circuit 4 includes a third multiplexer 7 and a fourth multiplexer 8. A first input end 71 of the third multiplexer is connected to a first output end 12 of the first full adder, and a second input end 72 of the third multiplexer is connected to a first output end 26 of the second full adder; a first input end 81 of the fourth multiplexer is connected to a second output end 13 of the first full adder, and a second input end 82 of the fourth multiplexer is connected to a second output end 27 of the second full adder.

In the embodiment of the present disclosure, the first multiplexer 5, the second multiplexer 6, the third multiplexer 7, and the fourth multiplexer 8 are two-channel data multiplexers, and the logic levels of the selection signals of the four multiplexers may be the same or different. The configuration principle of the selection signals of the four multiplexers is to ensure that the four multiplexers can output the expected signal correctly, and the configuration of the selection signal is not limited.

As shown in FIG. 6, if the most significant bit signal I4 of the compressor circuit is 0, the third selection signal, the fourth selection signal, the fifth selection signal, and the sixth selection signal are all set to 0. In this way, the output end 51 of the first multiplexer outputs the signal 0 of the first output end 53 of the first multiplexer, and the output end 63 of the second multiplexer outputs the signal 0 of the second output end of the second multiplexer, then the signals of the three input ends of the second full adder are all 0. Because the signals of the three input ends of the second full adder are all 0, the signals output from the two output ends of the second full adder are also 0, in this way, the third multiplexer 7 outputs the signals of the first output end 12 of the first full adder, the fourth multiplexer 8 outputs the signals of the second output end 13 of the first full adder, and an output signal Cout of the first output end 12 of the first full adder may also be used as the carry input of the compressor circuit of the next stage. In this case, the second full adder is turned off, which saves energy consumption and delay of the compressor circuit. In the embodiment of the present disclosure, it is only an exemplary description that the third selection signal, the fourth selection signal, the fifth selection signal, and the sixth selection signal are all 0, while the third selection signal, the fourth selection signal, the fifth selection signal, and the sixth selection signal may also be different. The configuration of the four selection signals needs to ensure that when the most significant bit signal is 0, the second selection circuit finally outputs the output signals of the first full adder.

As shown in FIG. 6, if the most significant bit signal I4 of the compressor circuit is 1, the selection signals of the first multiplexer 5, the second multiplexer 6, the third multiplexer 7, and the fourth multiplexer 8 are all set to 0. The output end 51 of the first multiplexer outputs a signal Cin of the second input end 52 of the first multiplexer, and the output end 63 of the second multiplexer outputs the signal of the first input end 61 of the second multiplexer, in this way, the input signals of the second full adder are not 0. Because the input signals of the second full adder are not 0, the third multiplexer 7 outputs the signal of the first output end 26 of the second full adder, and the fourth multiplexer 8 outputs the signal of the second output end 27 of the second full adder, in this way, the second full adder is turned on. The compressor circuit finally outputs the output signals of the second full adder, which ensures the accuracy of the output signals. In the embodiment of the present disclosure, it is only an exemplary description that the third selection signal, the fourth selection signal, the fifth selection signal, and the sixth selection signal are all 1, while the third selection signal, the fourth selection signal, the fifth selection signal, and the sixth selection signal may also be different. The configuration of the four selection signals needs to ensure that when the most significant bit signal is 1, the second selection circuit finally outputs the output signals of the second full adder.

It should be noted that in FIG. 4 and FIG. 6, both the first selection circuit and the second selection circuit include two two-channel multiplexers. In an actual scenario, other types and numbers of multiplexers may also be selected to compose the first selection circuit and the second selection circuit, which are not limited to FIG. 4 and FIG. 6.

An embodiment of the present disclosure further provides a Wallace tree circuit, which includes one or more compressor circuits as described in any one of the embodiments of FIG. 2 to FIG. 6.

In the embodiment of the present disclosure, the Wallace tree circuit may include one compressor circuit or a combination of a plurality of compressor circuits. When the Wallace tree circuit is applied to the multiplier circuit, the Wallace tree circuit is configured to accumulate the columns of each partial product to obtain two signals. For the Wallace tree circuit composed of a compressor circuit provided by the present disclosure, a full adder may be turned off in a compressor circuit of the first level (or the first pipeline stage) so as to reduce the energy consumption.

Figure 7:
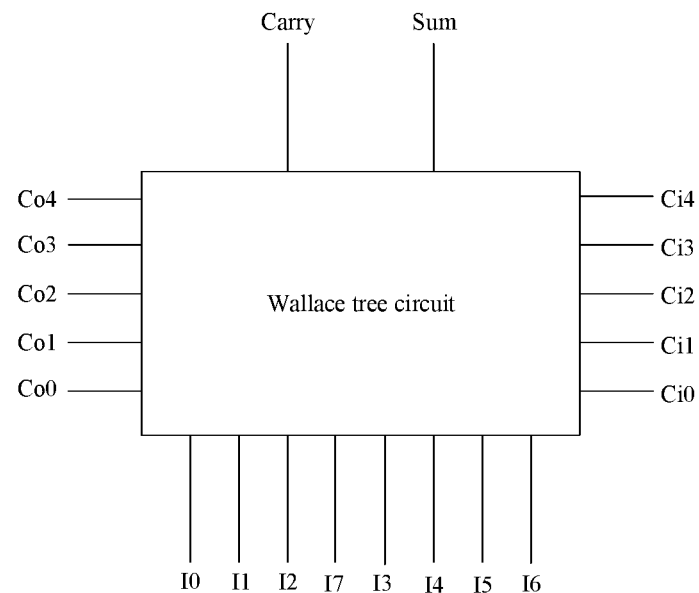
FIG. 7 is a schematic diagram of a Wallace tree circuit provided by an embodiment of the present disclosure.

FIG. 7 is a schematic diagram of a Wallace tree circuit provided by an embodiment of the present disclosure. As shown in FIG. 7, the Wallace tree circuit includes eight inputs I0, I1, I2, I3, I4, I5, I6, I7, two outputs Carry and Sum, five carry inputs Ci0, Ci1, Ci2, Ci3, Ci4, and five carry outputs Co0, Co1, Co2, Co3, Co4.

Figure 1:
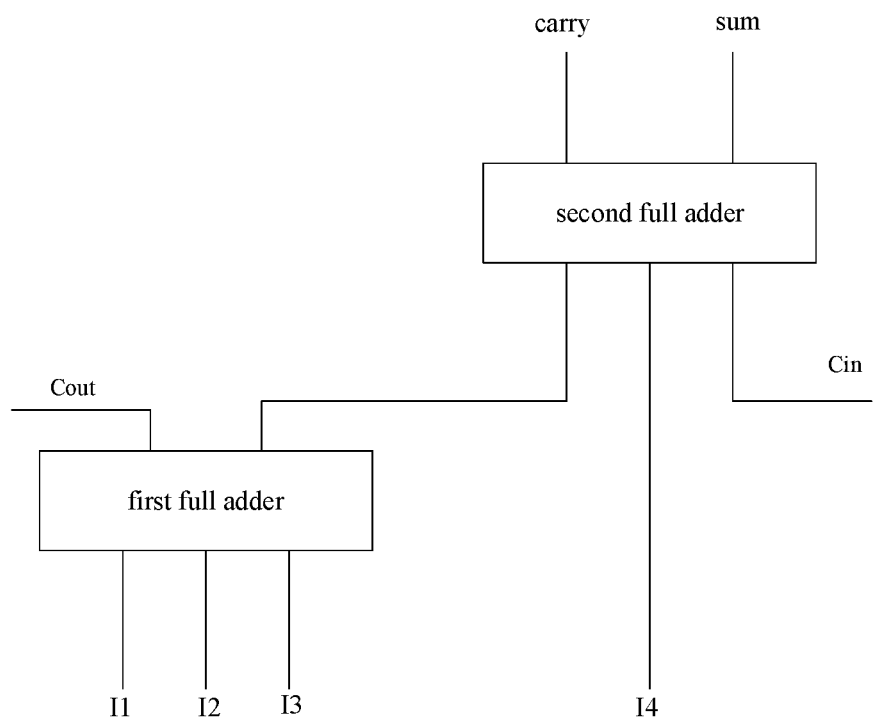
FIG. 1 is a structural diagram of a 4-2 compressor circuit in the prior art.
Figure 8:
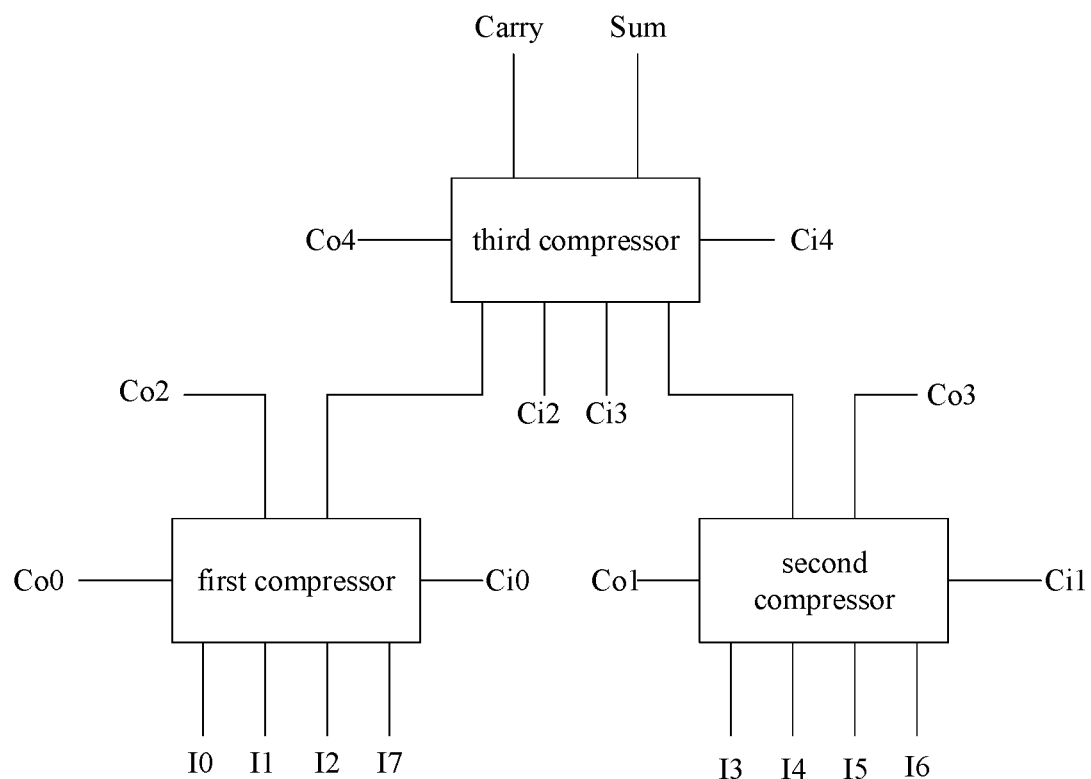
FIG. 8 is a structural diagram of a Wallace tree circuit provided by an embodiment of the present disclosure.

FIG. 8 is a structural diagram of a Wallace tree circuit provided by an embodiment of the present disclosure. FIG. 8 is a possible implementation manner of the Wallace tree circuit shown in FIG. 7. As shown in FIG. 8, the Wallace tree circuit is composed by three 4-2 compressors, and the Wallace tree circuit can accumulate eight input signals into two output signals. A first compressor and a second compressor may be a compressor circuit described in any of the embodiments of FIG. 2 to FIG. 6, and a third compressor may be a compressor circuit described in any of the embodiments of FIG. 2 to FIG. 6 or a conventional compressor circuit as shown in FIG. 1.

For example, for an unencoded 8*8 operation, a total of eight partial products are generated. The accumulation of the eight partial products require 16 Wallace tree circuits, where each Wallace tree circuit is composed by three 4-2 compressor circuits as shown in FIG. 8. During the accumulation of the eight partial products, each Wallace tree circuit has 8 inputs (for example, I7, I6, . . . I0), where the partial products of the small value corresponding to I6 and I7 are generally 0. Therefore, I7 and I6 are used as the high-order inputs of a 4-2 compressor, respectively. When I7 and I6 are 0, the high-order inputs of the two 4-2 compressor circuits in the first pipeline stage (the first layer) are both 0, in this way, one full adder is off in both of the two 4-2 compressor circuits, which could reduce the energy consumption.

Figure 9:
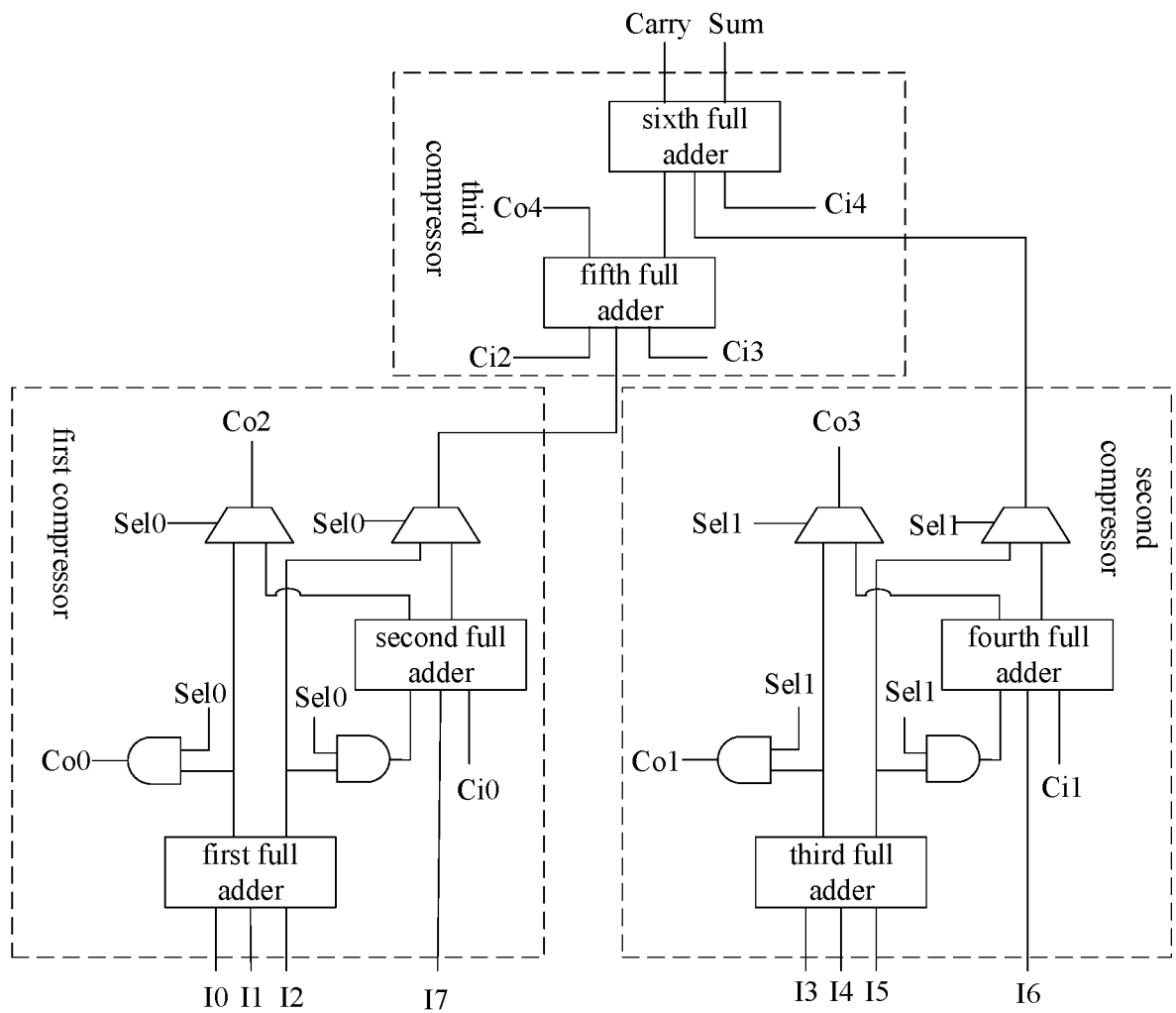
FIG. 9 is a structural diagram of a Wallace tree circuit provided by a second embodiment of the present disclosure.

FIG. 9 is a structural diagram of a Wallace tree circuit provided by a second embodiment of the present disclosure. FIG. 9 is another possible implementation manner of the Wallace tree circuit shown in FIG. 7 or FIG. 8. As shown in FIG. 9, in the compression circuits of the first compressor and the second compressor, two AND gate circuits are used to replace the multiplexers. Compared with FIG. 6, the AND gate circuits in FIG. 9 are used to replace the first multiplexer and the second multiplexer in FIG. 6, and the AND gate circuit with the carry output Co0 controls output signals of the first full adder. There is no multiplexer or AND gate circuit in the third compressor, and the third compressor is a conventional compressor.

Figure 10:
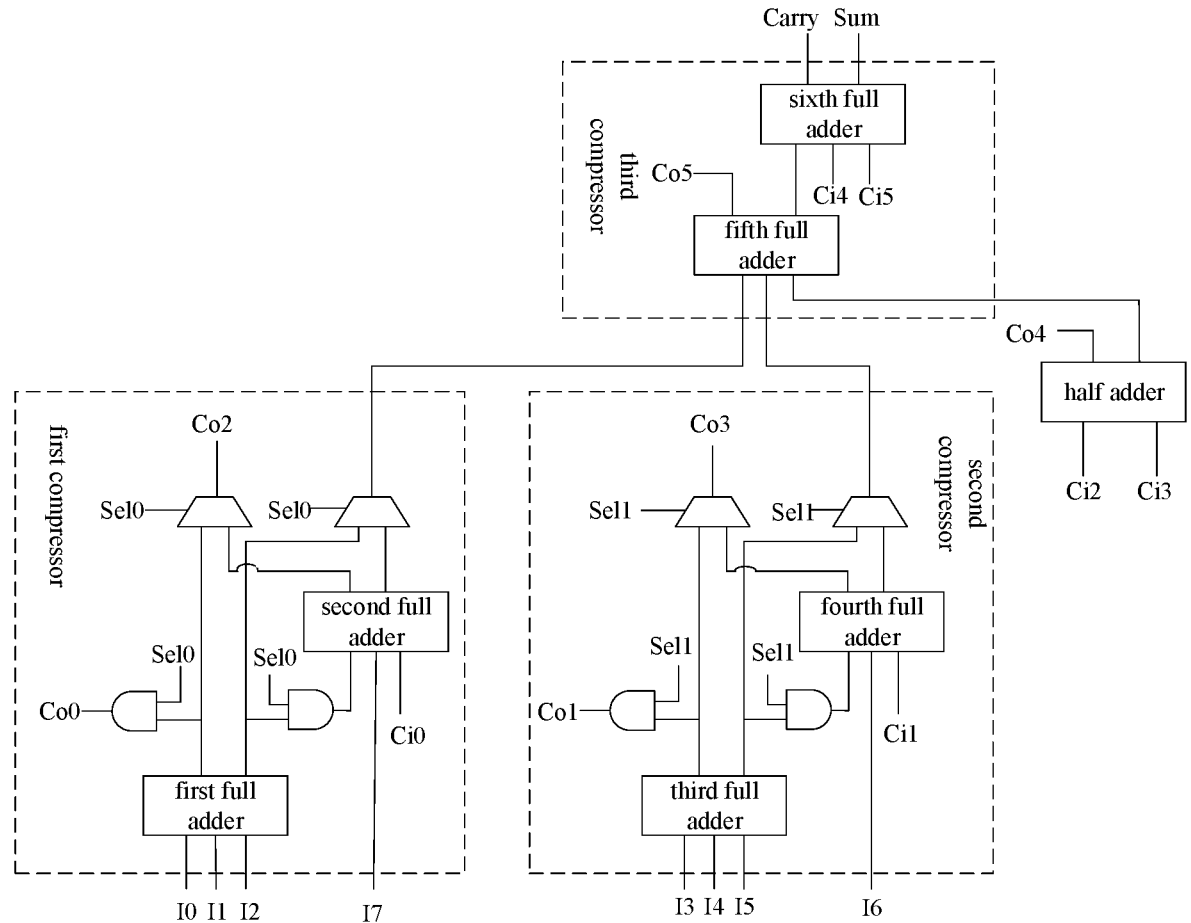
FIG. 10 is a structural diagram of a Wallace tree circuit provided by a third embodiment of the present disclosure.

FIG. 10 is a structural diagram of a Wallace tree circuit provided by a third embodiment of the present disclosure. As shown in FIG. 10, in the compression circuits of the first compressor and the second compressor, two AND gate circuits are used to replace the multiplexers. Unlike FIG. 9, a half adder is added to the Wallace circuit shown in FIG. 10. An output signal of the half adder is used as an input signal of a fifth full adder. By adding the half adder, the Wallace tree circuit can expand the five carry inputs Ci0, Ci1, Ci2, Ci3, Ci4 and five carry outputs Co0, Co1, Co2, Co3, Co4 to six carry inputs Ci0, Ci1, Ci2, Ci3, Ci4, Ci5 and six carry outputs Co0, Co1, Co2, Co3, Co4, Co5 shown in FIG. 7 to FIG. 9.

An embodiment of the present disclosure further includes a compression tree circuit, which includes one or more Wallace tree circuits.

Figure 11:
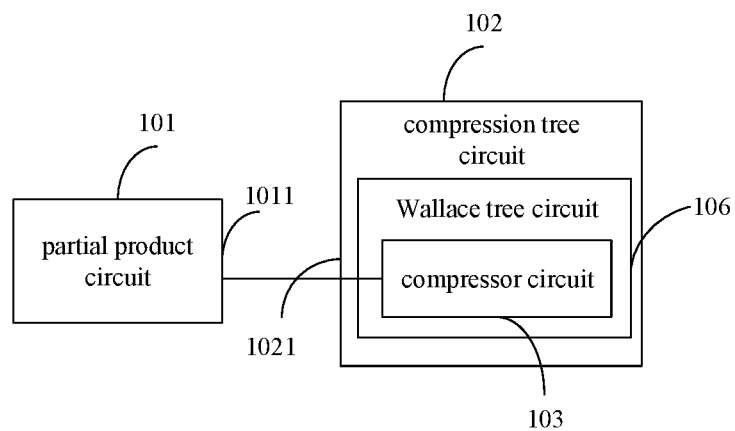
FIG. 11 is a structural diagram of a multiplier circuit provided by an embodiment of the present disclosure.

FIG. 11 is a structural diagram of a multiplier circuit provided by an embodiment of the present disclosure. As shown in FIG. 11, the multiplier circuit includes a partial product circuit 101 and a compression tree circuit 102 described in the above embodiment. An output end 1011 of the partial product circuit is connected to an input end 1021 of the compression tree circuit. The compression tree circuit 102 includes at least one Wallace tree circuit 106, and the Wallace tree circuit 106 includes at least one compressor circuit 103 as described in any one of the embodiments of FIG. 2 to FIG. 6.

In the embodiment of the present disclosure, the partial product circuit 102 is configured to perform a partial product operation on the input signals of the multiplier circuit to generate a plurality of input signals, and then the plurality of input signals are processed by the compression tree circuit 102 to obtain two output signals. That is, the partial product circuit 102 generates partial products by multiplying multipliers and multiplicands, and then the compression tree circuit accumulates the partial products to complete the multiplication operation.

A Wallace tree circuit 106 is drawn in FIG. 11, and a compressor circuit is also drawn in the Wallace tree circuit 106. A compression tree circuit may include a plurality of Wallace tree circuits, and each Wallace tree circuit may also include a plurality of compressor circuits, which can be selected according to actual needs, and are not limited in the embodiments of the present disclosure.

The multiplier circuit provided by the embodiment includes a partial product circuit 101 and a compression tree circuit 102, where an output end 1011 of the partial product circuit is connected to an input end 1021 of the compression tree circuit. The compression tree circuit 102 includes at least one of a compressor circuit 103 as described in any one of the embodiments of FIG. 2 to FIG. 5. The Wallace tree circuit controls the output signal of the first selection circuit of the compressor circuit by configuring the first selection signal, so that the output signal of the first selection circuit is a low level signal in some scenarios. When the output signal of the first multiplexer and the most significant bit signal of the plurality of input signals of the compressor circuit are both low level signals, the second full adder will not inverse logic level signal, that is, the second full adder is turned off and does not generate any energy consumption and delay, which may effectively reduce the energy consumption and delay of the compressor circuit. In this way, the energy consumption and delay of the multiplier circuit may be also reduced.

Figure 12:
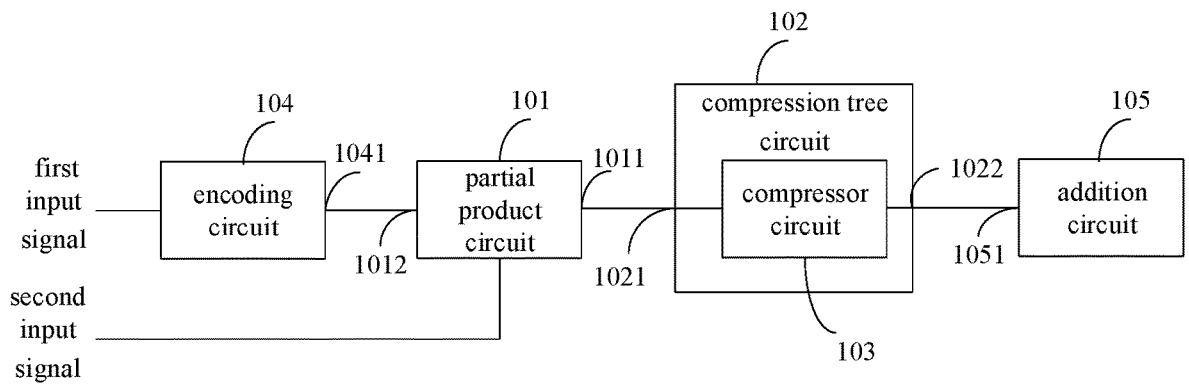
FIG. 12 is a structural diagram of a multiplier circuit provided by another embodiment of the present disclosure.

FIG. 12 is a structural diagram of a multiplier circuit provided by another embodiment of the present disclosure. As shown in FIG. 12, the multiplier circuit further includes an encoding circuit 104, where an output end 1041 of the encoding circuit is connected to an input end 1012 of the partial product circuit.

In the embodiment of the present disclosure, the encoding circuit is configured to encode a first input signal of the multiplier circuit, thereby reducing the number of partial products. For example, for an encoded 8*8 operation, after the encoding processing by the encoding circuit 104, 4 partial products are obtained by the partial product circuit 101. In this way, the compression tree circuit is composed of 16 Wallace tree circuits, and each Wallace tree has a 4-2 compressor circuit, which may reduce the power consumption of the subsequent compression tree circuits, improve the efficiency of the compression tree circuits, and reduce the delay.

Optionally, the encoding circuit may include a Booth encoder.

For a 16*16 multiplier circuit that has been encoded by Booth encoder, eight partial products are generated. The compression tree circuit is composed of 32 Wallace tree circuits, and each Wallace tree circuit is composed by three 4-2 compressor as shown in any one of the embodiments of FIG. 7 to FIG. 9.

Figure 13:
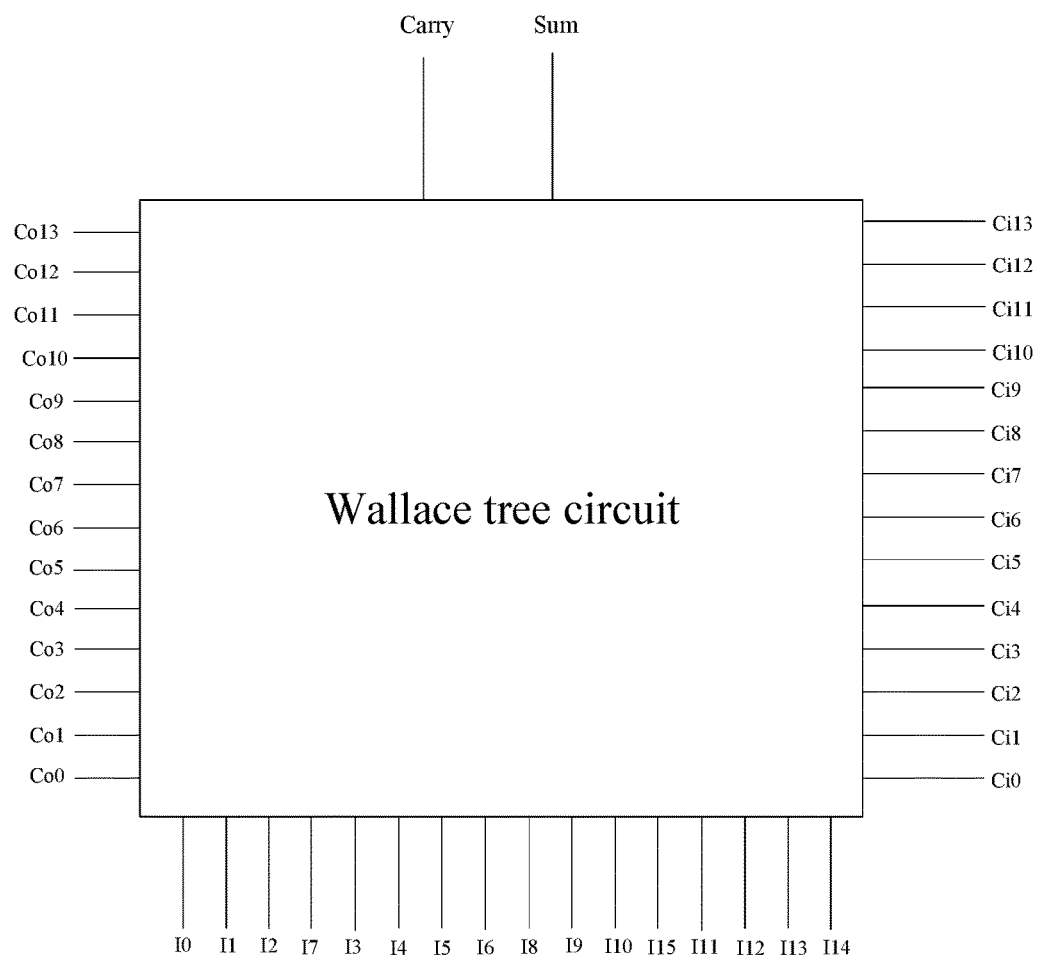
FIG. 13 is a structural diagram of another Wallace tree circuit provided by an embodiment of the present disclosure.

For a 32*32 multiplier circuit that has been encoded by Booth encoder, sixteen partial products are generated. The compression tree circuit is composed of 64 Wallace tree circuits, and each Wallace tree circuit is shown in FIG. 13.

The Wallace tree circuit includes 16 inputs I0, . . . , I15, 14 carry inputs Ci1, . . . , Ci13, 14 carry outputs Co1, . . . , Co13, and two outputs Carry and Sum.

Optionally, as shown in FIG. 12, the multiplier circuit further includes an addition circuit 105 including one or more adders. An output end 1022 of the compression tree circuit is connected to an input end 1051 of the addition circuit.

In the embodiment of the present disclosure, the addition circuit 105 may also be connected to an output end 1022 of the compression tree circuit, and the signals output by the compression tree circuit 102 may be accumulated to obtain a final output signal of the multiplier circuit. The addition circuit 105 may be composed of one or more adders.

Optionally, the adder may be, but is not limited to a carry-look-ahead adder.

An embodiment of the present disclosure further provides a chip, which includes one or more multiplier circuits according to the embodiment shown in FIG. 11 or FIG. 12.

Specifically, the chip may include at least one of a CPU (Central Processing Unit) chip, a GPU (Graphics Processing Unit) chip, a NPU (Neural-Network Processing Unit) chip, or a DSP (Digital Signal Process) chip. The NPU may be implemented through a hardware circuit, for example, the hardware circuit includes, but is not limited to, a field-programmable gate array (FPGA), a coarse grained reconfigurable architecture (CGRA), an application specific integrated circuit (ASIC), an analogue circuit, and a memristor).

An embodiment of the present disclosure provides a chip package structure, which may include the above-mentioned chip.

An embodiment of the present disclosure provides a board card, which may include the above-mentioned chip package structure.

An embodiment of the present disclosure provides an electronic apparatus, which may include the above-mentioned chip.

The electronic device may include, but is not limited to, a robot, a computer, a printer, a scanner, a tablet computer, an intelligent terminal, a mobile phone, an automobile data recorder, a navigator, a sensor, a webcam, a server, a cloud server, a camera, a video camera, a projector, a watch, an earphone, a mobile storage, a wearable device, a transportation means, a household electrical appliance, and a medical device.

The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

It should be noted that, for simplicity of description, the above-mentioned methods in the embodiments are all described as a series of circuit combinations. However, those skilled in the art should know that the present disclosure is not limited by the described circuit combination modes, because according to the present disclosure, some circuits can be implemented in other ways or structures.

Those skilled in the art should also be aware that the embodiments described in the specification are alternative embodiments and that the apparatus and modules involved are not necessary in the present disclosure.

In the embodiments, the description of each embodiment has different emphasis. For the parts not described in detail in one embodiment, reference may be made to related descriptions in other embodiments.

The above-mentioned embodiments only describe several implementation manners of the present disclosure, and descriptions of the embodiments are specific and detailed, but they should not be construed as limiting the patent scope of the present disclosure. It should be noted that, those skilled in the art, without departing from the concept of the present disclosure, several modifications and improvements can be made, and these modifications and improvements all belong to the protection scope of the present disclosure. Therefore, the protection scope of the present disclosure shall be subject to the appended claims.

What is claimed is:

1. A compressor circuit, comprising a first full adder, a second full adder, and a first selection circuit, wherein an output end of the first full adder is connected to an input end of the first selection circuit, and an output end of the first selection circuit is connected to an input end of the second full adder; wherein the first selection circuit is configured to determine an input signal output by the first selection circuit to the second full adder according to a first selection signal; and the input signal output by the first selection circuit to the second full adder and a most significant bit signal of a plurality of input signals of the compressor circuit are used to control turning on and turning off of the second full adder.

2. The compressor circuit of claim 1, further comprising a second selection circuit, wherein a first input end of the second selection circuit is connected to the output end of the first full adder, and a second input end of the second selection circuit is connected to an output end of the second full adder;

wherein the second selection circuit determines that an output of the second selection circuit is output signals of the first full adder or output signals of the second full adder according to whether a level of a second selection signal is high or low.

3. The compressor circuit of claim 2, wherein the first selection circuit comprises a first multiplexer and a second multiplexer, wherein an output end of the first multiplexer is connected to a third input end of the second full adder, and a first input end of the second full adder is connected to an output end of the second multiplexer; a second input end of the second full adder is configured to receive the most significant bit signal, and the output end of the second full adder is connected to the second input end of the second selection circuit; the output end of the first full adder is respectively connected to a first input end of the second multiplexer and the first input end of the second selection circuit.

4. The compressor circuit of claim 2, wherein the first selection circuit comprises a first AND gate circuit and a second AND gate circuit, wherein an output end of the first AND gate circuit is connected to a third input end of the second full adder, and a first input end of the second full adder is connected to an output end of the second AND gate; the second input end of the second full adder is configured to receive the most significant bit signal, the output end of the second full adder is connected to the second input end of the second selection circuit, and the output end of the first full adder is respectively connected to a first input end of the second AND circuit and the first input end of the second selection circuit.

5. The compressor circuit of claim 2, wherein the second selection circuit includes a third multiplexer and a fourth multiplexer, wherein

- a first input end of the third multiplexer is connected to the first output end of the first full adder, and a second input of the third multiplexer is connected to the first output end of the second full adder; and
- a first input end of the fourth multiplexer is connected to the second output end of the first full adder, and a second input end of the fourth multiplexer is connected to the second output end of the second full adder.

6. The compressor circuit of claim 2, wherein the first selection signal and the second selection signal are any one of following signals:

- a signal determined according to the most significant bit signal of a plurality of input signals, a preset invertible logic level signal, a signal obtained by prediction based on a historical selection signal, and a signal determined by an encoder in a multiplier circuit where the compressor circuit is located.

* * * * *